(12) United States Patent
Mai

(10) Patent No.: US 10,967,676 B2
(45) Date of Patent: Apr. 6, 2021

(54) RIM FOR A TIRE

(71) Applicant: MAI ITALIA S.r.l., Verona (IT)

(72) Inventor: Renato Mai, Verona (IT)

(73) Assignee: MAI IT ALLA S.R.L., Verona (IT)

(*) Notice: Subject to any disclaimer, the term of this patent is extended or adjusted under 35 U.S.C. 154(b) by 273 days.

(21) Appl. No.: 16/309,558

(22) PCT Filed: Jun. 13, 2017

(86) PCT No.: PCT/IB2017/053489
§ 371 (c)(1),
(2) Date: Dec. 13, 2018

(87) PCT Pub. No.: WO2017/216714
PCT Pub. Date: Dec. 21, 2017

(65) Prior Publication Data
US 2019/0308448 A1 Oct. 10, 2019

(30) Foreign Application Priority Data
Jun. 16, 2016 (IT) .................... 102016000062280

(51) Int. Cl.
*B60B 25/08* (2006.01)
*B60B 25/04* (2006.01)
*B60B 25/12* (2006.01)
*B60C 5/16* (2006.01)
(Continued)

(52) U.S. Cl.
CPC ............ *B60B 25/08* (2013.01); *B60B 25/045* (2013.01); *B60B 25/12* (2013.01); *B60B 25/22* (2013.01); *B60C 5/16* (2013.01); *B60C 15/0209* (2013.01); *B60C 15/0213* (2013.01); *B60C 2200/06* (2013.01)

(58) Field of Classification Search
CPC ....... B60B 25/04; B60B 25/045; B60B 25/08; B60B 25/12; B60B 25/14; B60B 25/18; B60C 5/16; B60C 15/0213
See application file for complete search history.

(56) References Cited

U.S. PATENT DOCUMENTS

| 2,929,430 A | 3/1960 | Sinclair et al. |
| 3,783,927 A | 1/1974 | Verdier |
| 3,913,653 A | 10/1975 | Verdier |

(Continued)

FOREIGN PATENT DOCUMENTS

FR 86820 4/1996

OTHER PUBLICATIONS

PCT/IB2017/053489, Aug. 25, 2017, International Search Report and Written Opinion.

*Primary Examiner* — Kip T Kotter
(74) *Attorney, Agent, or Firm* — Workman Nydegger

(57) ABSTRACT

A rim for a tire for means of displacement preferably for heavy loads at low-speed. The rim may include a main tubular body having a cylindrical surface extending between two lateral edges, a bead-seat having a greater diameter than the cylindrical surface of the tubular body and overlapped to it and at least a side-ring being overlapped to one of the lateral edges for the lateral containment of the tire. The rim may include compensating means interposed between the cylindrical surface of the tubular body and the bead-seat and in contact with them to realise a compensation in thickness.

21 Claims, 4 Drawing Sheets

Figure 1:
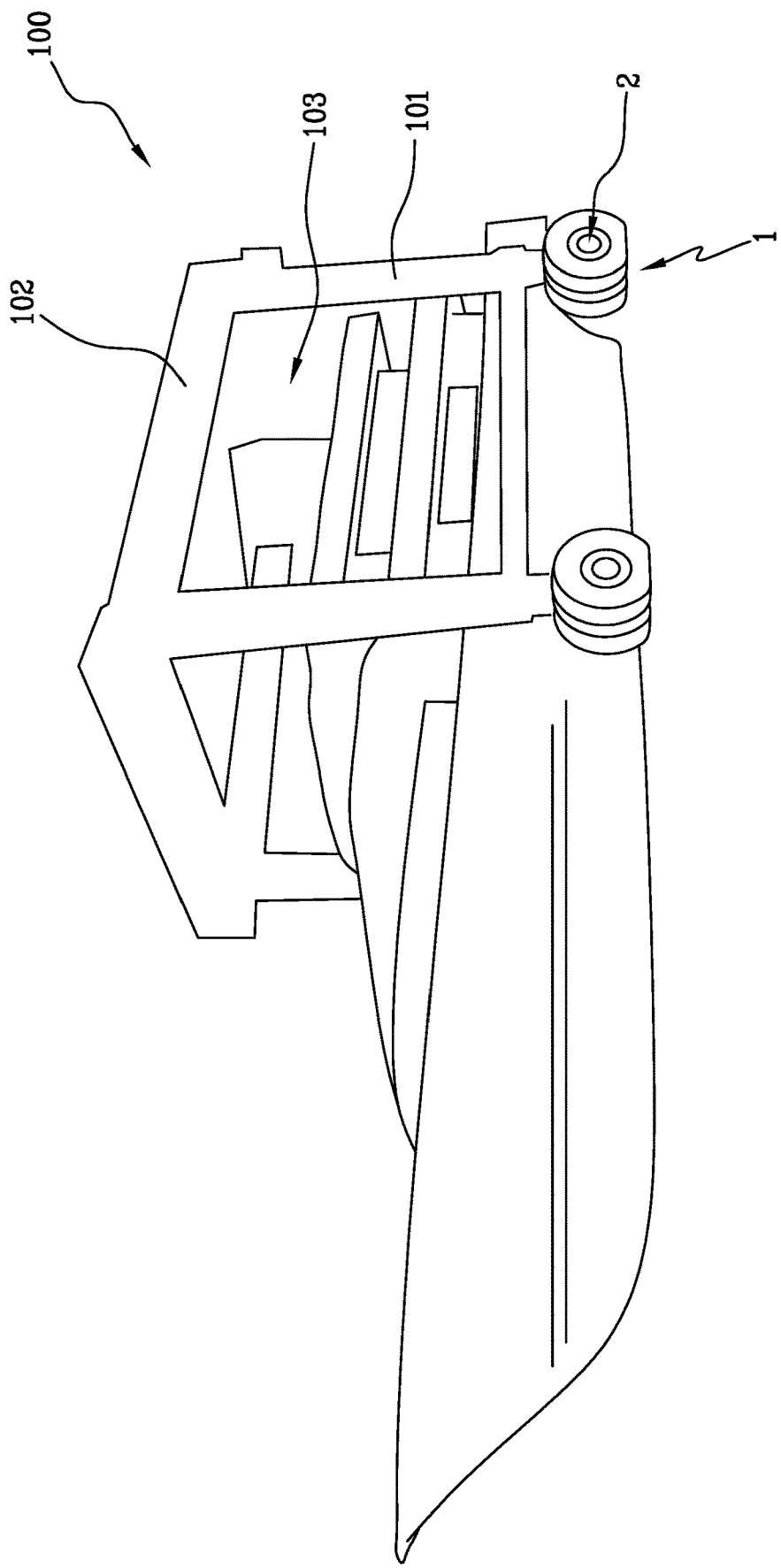

(51) Int. Cl.
*B60C 15/02* (2006.01)
*B60B 25/22* (2006.01)

(56) References Cited

U.S. PATENT DOCUMENTS

| | | | | |
|---|---|---|---|---|
| 4,003,421 A | | 1/1977 | Lejeune | |
| 4,144,922 A | * | 3/1979 | Strader | B60B 25/22 152/410 |
| 4,530,387 A | * | 7/1985 | Osawa | B60B 23/10 152/396 |
| 4,574,859 A | * | 3/1986 | Smith | B60B 25/04 152/410 |
| 4,706,723 A | * | 11/1987 | Loeber | B60B 25/04 152/396 |
| 6,296,320 B1 | * | 10/2001 | Miyashita | B60B 23/10 301/95.105 |
| 7,237,329 B2 | * | 7/2007 | Burston | B60B 25/10 29/802 |

* cited by examiner

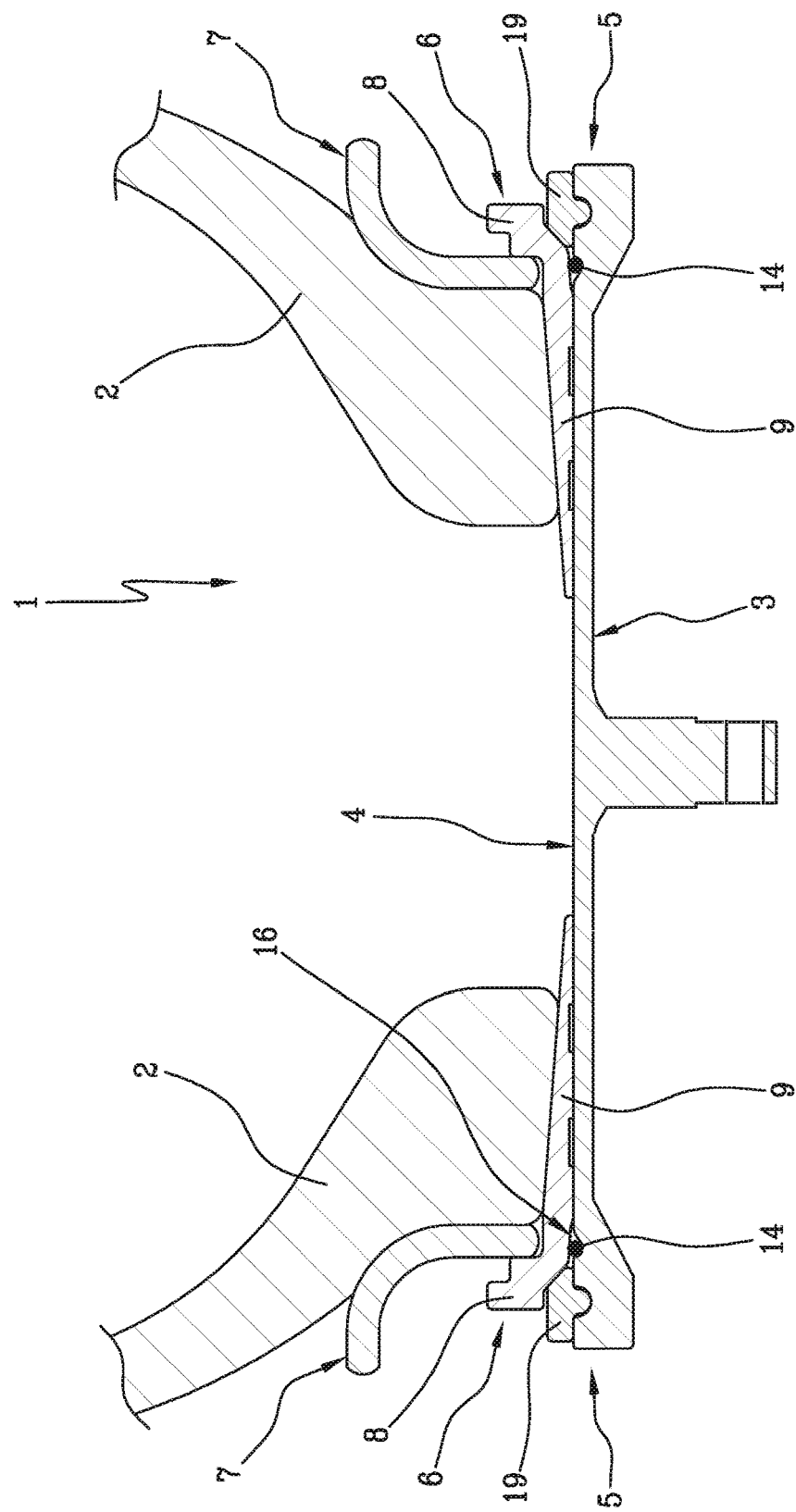

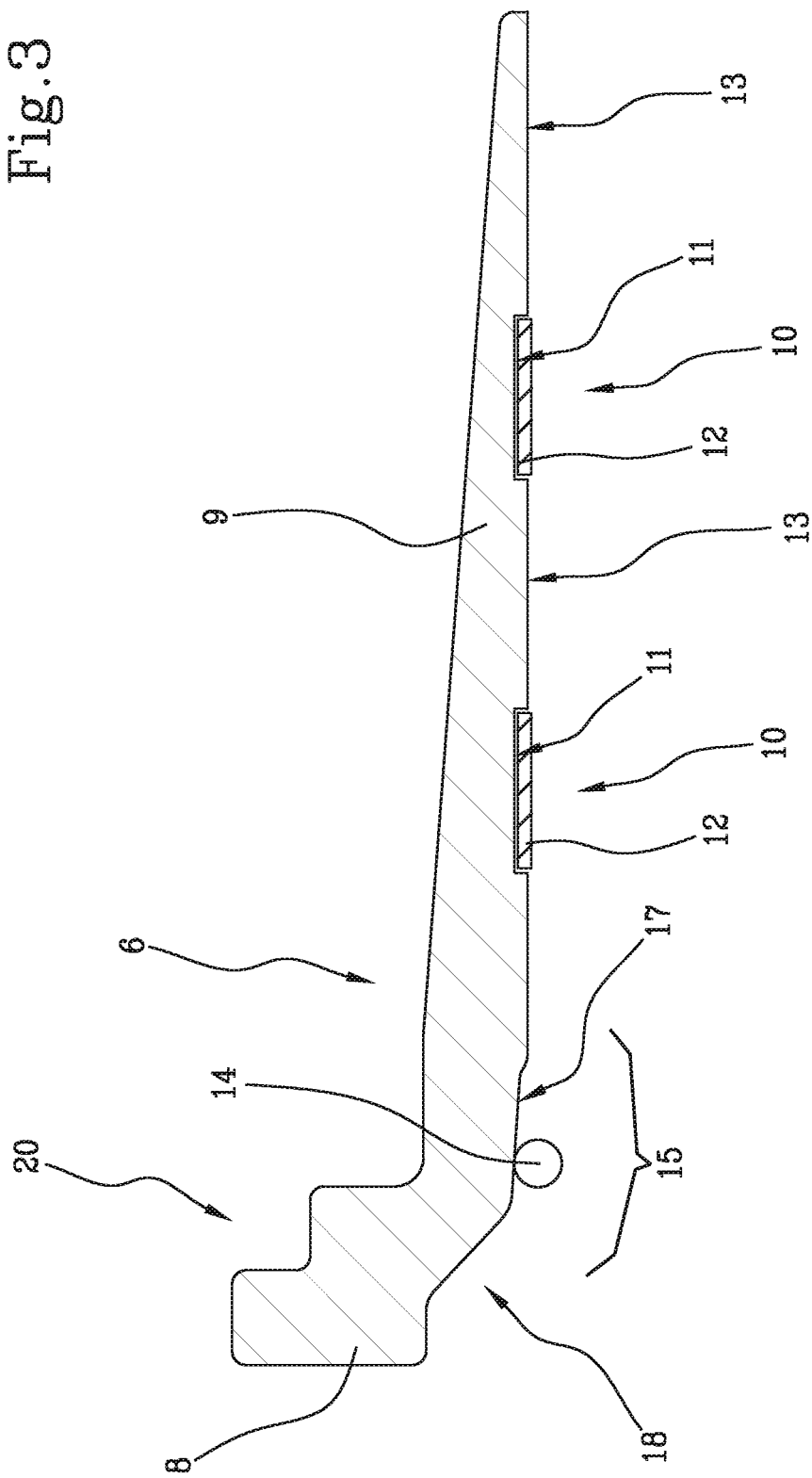

RIM FOR A TIRE

The present invention relates to a tire rim preferably intended for low-speed means of displacement or transportation of heavy loads. However, the present invention could also be used for means of displacement or transportation for any type of load and at any speed.

In particular, the term "heavy loads" is meant as loads comprised between 25 tons and 1000 tons and including, for example, ships or very heavy boats. The term "low speed" is meant as displacements at speeds comprised between 1 km/h and 5 km/h.

In fact, the present invention is preferably applied to means of displacement for launching and hauling boats, fishing vessels, yachts and sail boats or even means of transportation of prefabricated assemblies or the like. They are means of displacement comprising a frame having a vertical extension held together by two or more horizontal crossbars to which the loads are tied.

Currently, said means of displacement move over tracks or tires. In the latter case, rims are used on which tires are mounted.

The rims used are "multi-piece" rims and include:
a main tubular body;
one or more bead-seats each arranged at least at the edge of the main tubular body;
one or more side-rings each arranged above the bead-seat for lateral containment of the tire.

In the case of low-speed means of displacements of heavy loads, this type of structure entails several drawbacks mainly due to the fact that the coupling between the tubular body and the bead-seats must be extremely accurate otherwise the bead-seat tends to be deformed since it is pressed by the weight of the load causing the release of air from the tire. In addition to this, the rotation of the rim when in use does not allow compensating said loss of air since it occurs very slowly (¼ km/h).

Therefore, to overcome said drawbacks it is necessary to realise the main tubular body and/or the bead-seats by performing forging or lathing operations even after calendering or through "high precision systems" (engineered) such that the tubular body and the bead seats are perfectly coupled to each other.

However, said realisation methods are very expensive and require extended manufacturing time and, therefore, are deemed not advantageous.

A few examples of prior art are described in the documents U.S. Pat. Nos. 4,003,421, 2,929,430, FR86820 and U.S. Pat. No. 3,783,927.

In this situation, the object of the present invention is to realise a tire rim for means of displacement that obviates the above-cited drawbacks.

In particular, the object of the present invention is to realise a tire rim for means of displacement that is of easier and faster realisation allowing, at the same time, to avoid losses during the displacement of loads.

The objects indicated are substantially attained by a tire rim for means of displacement according to what is described in the appended claims.

Figure 2B:
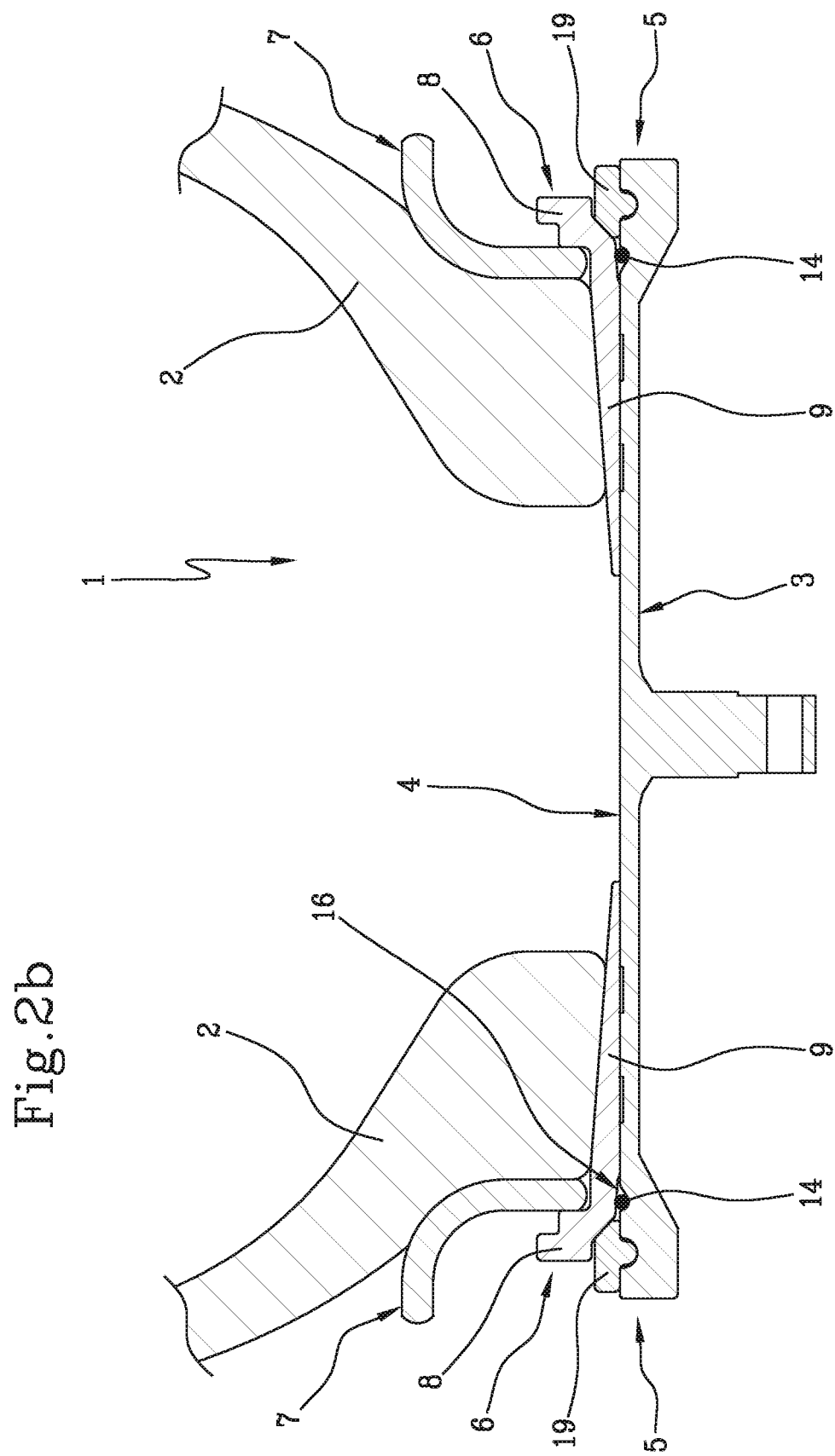

Further characteristics and advantages of the present invention will more greatly emerge from the detailed description of some preferred but not exclusive embodiments of a tire rim for means of displacement illustrated in the appended drawings, in which:

FIG. 1 is an axonometric view of a means of displacement of heavy loads comprising four rims realised according the present invention; and FIG. 2 is a side view of a lateral section of a rim realised according to the present invention; and FIG. 3 is the lateral view of a detail of the lateral section of the rim of FIG. 2;

With reference to the figures mentioned, reference number 1 generally denotes a rim 1 for a tire 2 for means of displacement 100 according to the present invention.

In particular, the rim 1 comprises a main tubular body 3 that extends around a rotation axis of the rim 1 and having a cylindrical surface 4 extending between two lateral edges 5 and, in use, facing the tire 2. In other words, the tubular body 3 defines the main part of the rim 1 on which a tire 2 is mounted.

The rim 1 is preferably of a multi-piece type.

In detail, a piece of the rim 1 is defined by the bead-seat having greater diameter than the cylindrical surface 4 of the tubular body 3 and overlapping it. Said bead-seat 6 is of circumferential shape and it surrounds the entire tubular body 3.

Preferably, the bead-seat 6 is arranged at the lateral edge 5 of the tubular body 3; even more preferably two bead-seats 6 are respectively arranged at both lateral edges 5 of the tubular body 3 (one for each lateral edge 5).

Another piece of the rim 1 comprises a side-ring 7 having greater diameter than the cylindrical surface 4 of the tubular body 3 and it is overlapped to one of the lateral edges 5 for lateral containment of the tire 2. In detail, the side-ring 7 extends circumferentially around the tubular body 3 and it abuts against the bead-seat 6. Preferably, the side-ring presents a cross-section curved from the lateral edge 5 facing the outside of the rim 1 such as to define a sort of "L".

It is also to be noted that the side-ring 7 and the bead-seat 6 can be disengaged from the rim 1 to favour the disassembly of the tire 2.

In addition, in the preferred embodiment illustrated in the appended figures the side-ring 7 is separated and can be disengaged with respect to the bead-seat 6. However, in an alternative embodiment not illustrated in the appended figures, the side-ring 7 could be realised in a single piece with the bead-seat 6 (in such a case a three-piece or five-piece rim is realised).

In particular, the bead-seat 6 is interposed between the cylindrical surface 4 of the tubular body 3 and the side-ring 7 and it abuts against them.

In the preferred embodiment illustrated in the appended figures, the bead-seat 6 comprises an external portion 8 with respect to a space occupied by the tire 2 (according to a direction parallel to the cylindrical surface 4) and an elongated portion 9 extending below the side-ring 7 inside the space occupied by the tire 2. The space occupied by the tire 2, according to a direction parallel to the cylindrical surface 4, is comprised between two side-rings 7.

Said elongated portion 9 narrows in thickness (understood in a radial sense with respect to the rim 1) going towards the interior of the space occupied by the tire 2. In other words, the elongated portion 9 is tapered towards the inside of the space occupied by the tire.

According to the present invention, the rim 1 comprises compensating means 10 interposed between the elongated portion 9 of the bead-seat 6 and the cylindrical surface 4 of the tubular body 3 and in contact with them to compensate the difference in thickness present between the bead-seat 6 and the cylindrical surface 4 of the tubular body 3 such as to eliminate the slack present between them that could generate losses of air.

Preferably, the compensating means 10 comprise a seat 11 afforded on the elongated portion 9 of the bead-seat 6 or on the cylindrical surface 4 of the tubular body 3 (the latter embodiment is not illustrated in the appended figures), and extending along a direction parallel to the cylindrical surface 4 for a preset length (preferably comprised between 20 mm and 30 mm). Said seat 11 has an annular (preferably circumferential) extension along the entire annular extension of the bead-seat 6 or on the cylindrical surface 4 of the tubular body 3. In addition, the seat 11 has a depth inside the bead-seat 6 or on the cylindrical surface 4 of the tubular body 3 of approximately 2 mm. Preferably, the seat 11 may present a cross-section of any geometrical shape, for example, round, square, rectangular, . . . .

In addition, the compensating means 10 comprise an annular element 12 inserted inside said seat 11 and arranged in contact with the bead-seat 6 and with the cylindrical surface 4. Preferably, the annular element 12 projects slightly from the seat 11 towards the tubular body 3 or towards the bead-seat 6 such as, during use, the annular element 12 moves from a more internal position of the seat 11 to a more projecting position depending on the position of the rim 1 such as to compensate the differences in thickness with the bead-seat 6.

In other words, the annular element 12 is mobile between a position retracting in the seat and a position projecting with respect to said seat such as to compensate said differences in thickness.

In particular, the annular element 12 presents a greater diameter than the diameter of the tubular body 3 or presents reduced thickness such as to perform the compensation work. In other words, the internal surface internal of the annular element 12 facing the tubular body 3, is (slightly) distanced with respect to the cylindrical surface 4 of the tubular body 3.

In other words, the innermost diameter of the annular element 12 is greater than the innermost diameter of the seat 11. The outermost diameter of the annular element 12 is greater than the outermost diameter of the bead-seat 6.

In particular, the annular element 12 can be closed or opened. In other words, the annular element 12 defines a sort of piston ring.

Advantageously, during operation, the annular element 12 deforms and decentralises with respect to the tubular body 3 as a function of the portion of rim in contact with the ground (where the weight is discharged).

It should be noted that the elongated portion 9 presents an external surface 13 facing on the surface on which the seat 11 is afforded, whose surface is flat and entirely adhering to the cylindrical surface 4. Also, the cylindrical surface 4 is preferably flat.

More generically, the external surface 13 and the cylindrical surface 4 are flat with respect to each other and parallel at least to the portion along which the compensating means 10 extend.

In the preferred embodiment illustrated in the appended figures, the compensating means 10 comprise two of said seats 11 distanced from each other along the extension of the elongated portion 9 and the respective annular elements 12 are inserted in said seats 11. Preferably, the distance of the two seats 11 is comprised between 20 mm and 40 mm. In other embodiments not illustrated in the appended figures, the compensating means 10 could also comprise more than two seats 11 distanced from each other along the development of the elongated portion 9 such as to increase the compensation.

It should be noted that the annular element 12 is realised in harder material than the sealing gasket 14 such as not to define a sealing.

In other words, the annular element 12 is not a sealing gasket but it is configured only to compensate mechanically the differences in thickness.

Preferably, the annular element 12 is preferably a strap at least in part realised in PVC (polyvinyl chloride). Alternatively, the strap can be realised in metallic material or plastic or other material not expressly mentioned herein.

Advantageously, the presence of compensating means 10 between the bead-seat and the tubular body 3 of the rim 1 allows compensating the differences in thickness between the two, such as to avoid air losses inside the tire 2 towards the outside passing under the bead-seat.

In addition, the rim 1 comprises a sealing gasket 14 interposed between an intermediate portion 15 of a bead-seat 6 and the cylindrical surface 4. In particular, said intermediate portion 15 being interposed between the external portion 8 and the elongated portion 9 and is the part that is located under the side-ring 7. The cylindrical surface 4 of the rim 1 presents a recess 16 facing the intermediate portion 15 to house a part of said gasket 14. Said gasket 14 is preferably of an O-ring type.

In FIG. 3 it is possible to see that the external surface 17 of said intermediate portion 15 (which external surface 17 faces the cylindrical surface 4) is flat and inclined from the elongated portion 9 to the external portion 8 such as to leave more free space with respect to the tubular body 3 approaching the respective lateral edge 5. In other words, the space for the gasket 14 enlarges going from the elongated portion 9 towards the external portion 8. In practice, the intermediate portion 15 is the one under which the gasket 14 is located and it is inclined.

In this manner, during the use of the rim 1, the pressure of the bead-seat against the tubular body 3 does not presses completely on the gasket 14 since an "extension" space of the gasket 14 remains thanks to the presence of the inclined surface.

It should be noted that said inclined surface does not present humps or projections, but it is advantageously flat.

In detail, the external surface 17 of said intermediate portion 15 is inclined by an angle comprised between 3° and 6° with respect to a plane parallel to the cylindrical surface 4 of the tubular body 3. Preferably, said angle is equal to 4°.

In addition, going towards the exterior, the inclined part joins with the external portion 8 via a connecting surface 18 more inclined than the first (approximately 45°) such as to leave space to an external lock ring 19.

In fact, the rim 1 comprises also an external lock ring 19 inserted, in use, between the bead-seat 6 and the lateral edge 5 to lock the bead-seat.

The internal surface (top in the figures) of the bead-seat 6 presents a step 20 against which the base of side-ring 7 abuts to contain the bead of a tire 2 being pushed towards the exterior (when inflated).

It should be noted that what is mentioned above in relation to a lateral edge 5, a bead-seat 6, a side-ring 7, a gasket 14 and compensating means 10, is understood as extended also to the preferred case wherein the rim 1 presents said elements located at both lateral edges 5.

In particular, the rim 1 comprises two side-rings 7 and two bead-seats 6 at the lateral edges 5, respectively. Said compensating means 10 are located at each bead-seat 6.

The subject matter of the present invention is also a means of displacement 100 preferably for heavy loads and at low-speed, comprising at least two rubberised wheels each one of which comprises a rim 1 of the type described above wherein a tire 2 is mounted on said rim 1.

Preferably, this means of displacement 100 comprises four wheels fastened to the base of four bearing columns 101 which are connected to each other via crossbars 102 arranged on top of the columns 101. Furthermore, the means of displacement 100 comprises a load lifting system 103 connected to the crossbars 102 and/or the columns 101. Said lifting system 103 will not be described further herein since it is of known type.

As regards the functioning of this invention, it should be noted that during the movement of the means of displacement 100 any differences in thickness between the bead-seat and the tubular body 3 of the rim 1 are compensated by:
- presence of the compensating means 10 below the bead-seat that allow compensating the differences in thickness blocking the losses of air;
- presence of an inclined surface above the gasket 14 (O-ring) such as to avoid pressing/cutting the gasket 14 itself during use.

Consequently, the present invention reaches the set objects, in particular it reaches the effect of obtaining a rim 1 more resistant to heavy loads that avoids losses of air.

Also, worthy of note is that the present invention is relatively easy to realise and also that the cost connected to the actuation of the invention is not very high.

The invention claimed is:

1. A rim for a tire, comprising:
   a main tubular body extending around a rotation axis of the rim and having a cylindrical surface extending between two lateral edges and, in use, facing the tire;
   a bead-seat having a greater diameter than the cylindrical surface of the tubular body and overlapped to it; said bead-seat comprising an external portion with respect to a space occupied by the tire and an elongated portion extending inside the space occupied by the tire;
   characterised in that it comprises compensating means interposed between the elongated portion of the bead-seat and the cylindrical surface and in contact with them to compensate the differences in thickness present between the bead-seat and the tubular body;
   said compensating means comprising an annular element that surrounds the tubular body and a seat having an annular extension around the body and extending also along the direction parallel to the cylindrical surface for a preset length; said annular element being inserted in said seat and arranged in contact with the bead-seat and with the cylindrical surface; said annular element presenting one of its own surfaces facing inside the seat distanced by the bottom of said seat and said annular element projecting from the seat and sliding inside the seat, in a radial direction with respect to the body, towards the tubular body or towards the bead-seat during use, the annular element moves from a more internal position of the seat to a more projecting position depending on the position of the rim to realise said compensation of the differences in thickness between the tubular body and the bead-seat.

2. The rim according to claim 1, wherein said seat is afforded on the elongated portion of the bead-seat.

3. The rim according to claim 2, wherein the compensating means comprise two seats distanced from each other along the direction parallel to the cylindrical surface and annular elements respectively inserted in said seats.

4. The rim according to claim 1, wherein said seat is afforded on the part of the cylindrical surface of the tubular body facing the elongated portion of the bead-seat.

5. The rim according to claim 1, wherein the annular element is open.

6. The rim according to claim 1, wherein the annular element is closed.

7. The rim according to claim 1, wherein the annular element comprises a strap.

8. The rim according to claim 7, wherein the strap is realised in polyvinyl chloride (PVC).

9. The rim according to claim 1, wherein the elongated portion presents an external surface facing the cylindrical surface; said external surface and said cylindrical surface being parallel to each other at least along the portion along which the compensating means extend.

10. The rim according to claim 1, wherein the elongated portion presents an external surface facing and in contact with the cylindrical surface; said external surface and said cylindrical surface being flat.

11. The rim according to claim 1, wherein the annular element projects radially from the cylindrical surface towards the bead-seat or from the bead-seat towards the cylindrical surface by a preset thickness.

12. The rim according to claim 11, wherein said annular element has an external diameter greater than the diameter of the bead-seat.

13. The rim according to claim 1, wherein the annular element has an internal diameter greater than the internal diameter of the seat.

14. The rim according to claim 1, wherein it comprises a sealing gasket interposed between an intermediate portion of the bead-seat and the cylindrical surface; said intermediate portion being arranged between the external portion and the elongated portion.

15. The rim according to claim 14, wherein the annular element is realised in harder material than the sealing gasket such as not to define a sealing.

16. The rim according to claim 14, wherein the external surface of said intermediate portion facing the cylindrical surface is flat and inclined from the elongated portion to the external portion such as to leave more free space with respect to the tubular body approaching the respective lateral edge; said sealing gasket being placed at said flat and inclined part of the elongated position.

17. The rim according to claim 16, wherein the external surface of said intermediate portion is inclined by an angle comprised between 3° and 6° with respect to a plane parallel to the cylindrical surface of the tubular body.

18. The rim according to claim 1, wherein the annular element does not define a sealing gasket of the rim.

19. The rim according to claim 1, further comprising two side-rings and two bead-seats respectively at the lateral edges; said compensating means being placed at each bead-seat.

20. The rim according to claim 1, further comprising at least a side-ring having greater diameter than the cylindrical surface of the tubular body and being overlapped to one of the lateral edges for the lateral containment of the tire; said bead-seat being interposed between the cylindrical surface of the tubular body and the side-ring and being in contact with them.

21. A means of displacement comprising at least a wheel comprising the rim according to claim 1, wherein a tire is mounted on said rim.

\* \* \* \* \*